US008942929B2

(12) United States Patent
Hobbs

(10) Patent No.: US 8,942,929 B2
(45) Date of Patent: Jan. 27, 2015

(54) METHOD FOR FIELD-MEASURING FLUID FLOW METERS

(75) Inventor: Clinton Paul Hobbs, Hemet, CA (US)

(73) Assignee: McCrometer, Inc., Hemet, CA (US)

( * ) Notice: Subject to any disclaimer, the term of this patent is extended or adjusted under 35 U.S.C. 154(b) by 891 days.

(21) Appl. No.: 13/140,665

(22) PCT Filed: Dec. 11, 2009

(86) PCT No.: PCT/US2009/067649
§ 371 (c)(1),
(2), (4) Date: Nov. 28, 2011

(87) PCT Pub. No.: WO2010/080341
PCT Pub. Date: Jul. 15, 2010

(65) Prior Publication Data
US 2012/0059602 A1  Mar. 8, 2012

Related U.S. Application Data
(60) Provisional application No. 61/139,317, filed on Dec. 19, 2008.

(51) Int. Cl.
| | | |
|---|---|---|
| G01F 3/02 | (2006.01) | |
| G01F 3/04 | (2006.01) | |
| G01F 3/06 | (2006.01) | |
| G01F 3/12 | (2006.01) | |
| G01F 25/00 | (2006.01) | |
| G01F 1/36 | (2006.01) | |
| G01F 1/40 | (2006.01) | |
| G01F 1/50 | (2006.01) | |

(52) U.S. Cl.
CPC .............. *G01F 25/0007* (2013.01); *G01F 1/36* (2013.01); *G01F 1/40* (2013.01); *G01F 1/50* (2013.01)
USPC .................. 702/45; 702/48; 702/56; 702/100

(58) Field of Classification Search
USPC ........ 702/45, 48, 56, 94, 100, 116; 73/861.52
See application file for complete search history.

(56) References Cited

U.S. PATENT DOCUMENTS

| | | | |
|---|---|---|---|
| 3,686,946 A | 8/1972 | Halmi | |
| 4,337,668 A | 7/1982 | Zupanick | |
| 7,832,283 B2 * | 11/2010 | Peters et al. | 73/861.52 |
| 7,992,453 B1 * | 8/2011 | Lawrence | 73/861.42 |
| 2002/0029130 A1 | 3/2002 | Eryurek et al. | |
| 2011/0259119 A1 * | 10/2011 | Steven | 73/861.42 |

FOREIGN PATENT DOCUMENTS

WO  WO 2007/086897  8/2007

OTHER PUBLICATIONS

International Search Report mailed Jul. 14, 2010 with respect to PCT/US2009/067649.

* cited by examiner

*Primary Examiner* — Eliseo Ramos Feliciano
*Assistant Examiner* — Felix Suarez
(74) *Attorney, Agent, or Firm* — Greer, Burns & Crain, Ltd.

(57) ABSTRACT

A method for taking field measurements of a cone type fluid flow meter including a meter body and a cone-type fluid displacement member to determine when to calibrate or replace the fluid flow meter. The method includes taking measurements of dimensions of the fluid displacement member and the meter body, evaluating the dimension measurements and ascertaining whether the dimension measurements are within designated dimension limits. The present method saves significant time and costs by taking measurements in the field determining whether to calibrate or replace the fluid flow meter.

2 Claims, 3 Drawing Sheets

METHOD FOR FIELD-MEASURING FLUID FLOW METERS

This application is a U.S. National Phase under 35 U.S.C. §371 of International Application No. PCT/US2009/067649, filed Dec. 11, 2009, which claims priority from U.S. Provisional Patent Application No. 61/139,317, filed Dec. 19, 2008.

FIELD OF THE INVENTION

This application relates generally to fluid flow meters, and more specifically, to a method of field-measuring fluid flow meters of the cone type.

BACKGROUND OF THE INVENTION

U.S. Pat. Nos. 4,638,672, 5,363,699 and 5,814,738 disclose fluid flow meters and fluid dispersing and mixing devices characterized by a unique static fluid flow displacement member of the cone type, which is mounted symmetrically within a section of conduit and is effective to linearism fluid flow through the conduit within a region defined between the displacement member and the interior surface of the conduit. The fluid flow displacement member flattens the velocity profile of fluid flow in the conduit both upstream and downstream from the displacement member, insures reliable measurement of fluid flow conditions within the conduit and provides for homogeneous blending and dispersing of diverse fluids and/or fluids containing particulate matter.

The unique fluid flow meters and mixers are made and sold under the registered trademark "V-CONE" by McCrometer, Inc. of Hemet, Calif. which is the owner of the above patents and the assignee of the present invention.

Cone-type flow meters, and more specifically, the fluid flow displacement members and conduit sections in which they are mounted, can deteriorate over time due to deposits, corrosion and abrasion, and therefore must be inspected periodically to determine if calibration, re-calibration or replacement is necessary. Inspection typically requires that the flow meter be removed from the pipeline, shipped to a laboratory and inspected remotely from the field. The need for remote laboratory inspection requires sealing the pipeline while the meter is out of service, which significantly increases the time and money spent on maintaining the fluid flow meters and causes delays for the time that the flow meter is removed from the pipeline for remote inspection and calibration, if required.

Accordingly, there is a need for a method of inspecting cone-type fluid flow meters in the field that provides information on whether calibration, re-calibration or replacement of the flow meters is necessary.

SUMMARY OF THE INVENTION

A method is provided for taking field measurements of cone-type fluid flow meters and for determining whether the flow meter needs to be replaced and/or sent to a laboratory for calibration. The method includes taking measurements of the components of the meter, evaluating the measurements taken and determining whether the measured dimensions are or are not within designated specifications and/or tolerances. The method of the invention saves significant time, energy and costs by taking measurements in the field for determining whether the meter is within specifications and may remain in service or the meter is outside specifications and needs to be sent to a laboratory for wet calibrations.

Another method provides an "as built" measurement set including the above measured values to a user with the documentation package associated with the flow meter. The "as built" measurement set is used as guide for taking the above measurements in the field to assure that the "as built" measurements and the field measurements are similar.

These and other features and advantages of the invention will become apparent to those of reasonable skill in the art from the following detailed description, as considered in conjunction with the accompanying drawings.

DETAILED DESCRIPTION

The following is a detailed description of preferred embodiments of a method of field-measuring a fluid flow meter presently contemplated by the inventor to be the best mode of carrying out the invention. Modifications and changes therein will become apparent to persons of reasonable skill in the art as this description proceeds.

Figure 1:
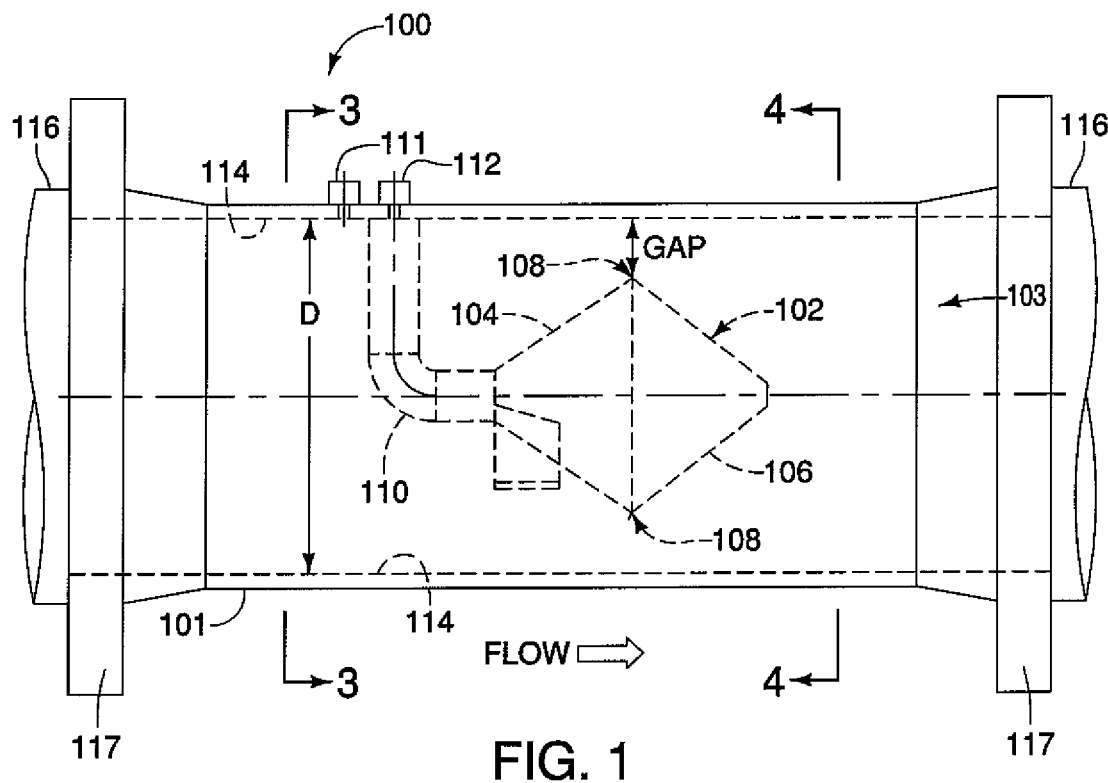
FIG. 1 is a side view of a fluid flow meter of a cone type for measuring fluid flow in a pipeline.

Referring now to FIG. 1, the preferred embodiment measures certain dimensions or parameters of a fluid flow meter 100 in the field to determine if calibration, re-calibration or replacement of the flow meter or parts of the flow meter are necessary. The fluid flow meter 100 includes a meter body 101 that is connected in a pipeline, more specifically, between pipe sections 116 having flanges 117. The meter body 101 includes a through hole or bore 103 in which a fluid displacement member 102 is positioned and mounted to linearize the fluid flow through the fluid flow meter body 101. Specifically, the fluid displacement member 102 is mounted to the meter body 101 using tubular mounting member 110. The fluid displacement member 102 includes a frusto-conical upstream portion 104 and an optional but preferred frusto-conical downstream portion 106. The mounting member 110 is generally L-shaped and extends through the wall of the meter body 101 and communicates axially through the interior of the fluid displacement member with the downstream face of the downstream portion 106. The upstream portion 104 and the downstream portion 106 are made of conical, sloped walls, which face, respectively, in the upstream and downstream directions. Except as hereinafter described, the upstream portion 104 and downstream portion 106 have essentially the same physical characteristics and function in essentially the same manner as the flow displacement members utilized in the "V-Cone" devices available from McCrometer, Inc. and those described in U.S. Pat. Nos. 4,638,672, 5,363,699 and 5,814,738, the disclosures of which are incorporated herein.

The fluid displacement member 102 is smaller in size than the bore 103 defined by the meter body 101 and is mounted coaxially within the bore 103 normal to the direction of the fluid flow. The sloped walls of the upstream portion 104 and the downstream portion 106 are symmetrically spaced inwardly from the inside surface 114 of the meter body 101. As shown in FIG. 1, the upstream portion 104 and the downstream portion 106 meet at a peripheral edge (i.e., beta edge) 108. As shown in FIG. 1, the edge 108 is the closest point to the inside surface 114 of the meter body 101.

The fluid flow meter 100 also includes longitudinally spaced pressure taps 111 and 112 that extend radially through the wall of the meter body 101 at spaced apart locations. The taps 111 and 112 communicate respectively with an area within the body 101 upstream of the displacement member 102 and an area within the body 101 axially adjacent and downstream from the downstream face 106 of the displacement member 102. The pressures and pressure differential sensed at the taps 111 and 112 enable highly accurate flow measurements using conventional fluid flow measurement instrumentation (not shown) connected to the taps.

As fluid enters the inlet or upstream end of the fluid flow meter 100, it is displaced or deflected by the upstream portion 104 of the fluid displacement member 102. Specifically, the fluid flows into an annular region of progressively decreasing cross sectional area to a minimum annular area at the plane of the edge 108. The fluid then flows into an annular region of progressively increasing area as defined by the downstream portion 106. The fluid displacement member 102 in this manner stabilizes and conditions the fluid flow on both the upstream and downstream sides of the fluid displacement member 102 over a predetermined range of flow rates. Stabilizing the fluid flow eliminates disturbances around the fluid displacement member 102 and provides highly stable pressure signals at the measurement taps 111 and 112

Deteriorating physical conditions can, however, adversely affect the fluid flow and thereby destabilize the signals. For example, particulates or other matter in the fluid may be deposited on and build-up on the upstream and/or downstream portions 104, 106 of the fluid displacement member 102. If the deposits are substantial, the deposits can disturb the fluid flow and affect the signal. Also, corrosion or abrasion of the meter body 101 and/or the fluid displacement member 102 can affect the fluid flow and signal in the same way. In particular, the parts of the flow meter that are most susceptible to deterioration and wear are the inlet area of the meter body 101 and the surfaces refining the annular space or gap surrounding the fluid displacement member 102 and its beta edge 108.

Therefore, it is important to inspect and, if needed, to calibrate or re-calibrate the fluid flow meter 100 periodically to make sure that deteriorating conditions are not affecting the performance of the meter.

Typically, the fluid flow meter 100 is removed from the pipeline to perform tests, calibrations and re-calibrations of the fluid flow meter at a remote location, which is time consuming and expensive. The preferred method inspects and measures dimensions of the flow meter 100 in the field to determine whether tests, calibrations, re-calibrations or replacement is necessary, which saves significant time and costs.

The method of the invention includes performing a visual inspection and taking a set of physical measurements in the field to determine if the fluid flow meter 100 requires calibration, re-calibration or replacement.

In an embodiment, the method includes visually inspecting the fluid flow meter 100 through an access port after it has been in service for a designated period of time such as one year as described by block 200. The inspection includes determining whether any deteriorating conditions exist which would significantly alter either the inside area of the pipe (i.e., the inlet area) or the annular area around the fluid displacement member 102, and would therefore severely alter the condition of the edge 108 or change the diameter of the fluid displacement member 102 as described by block 202. If the fluid flow meter 100 does not include an access port, then inspection is preformed in any other suitable manner. If the inspection indicates a deteriorating condition, then the fluid flow meter 100 is removed from the pipeline 116 in the field and inspected. Specifically, the fluid flow meter 100 is inspected to determine if there is any apparent deterioration, deposition, corrosion or abrasion as described above. After removal from the pipeline, a set of measurements is taken that will help to determine if calibration, re-calibration or replacement of the flow meter 100 or the fluid displacement member 102 is necessary.

Figure 3:
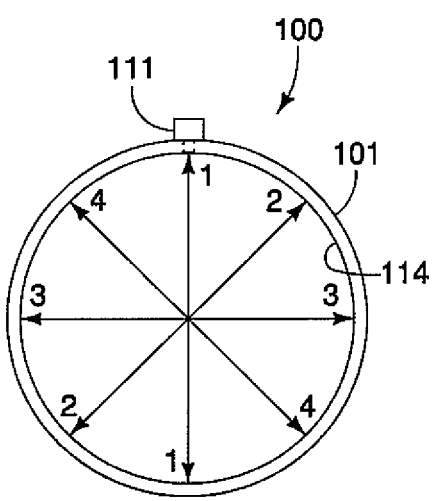
FIG. 3 is a schematic diagram taken generally along line 3-3 of FIG. 1 illustrating different measurement locations of the inner diameter of the upstream or inlet end of the meter body of the meter of FIG. 1.

If a deteriorating condition exists, measurements of the inside diameter (D) of the flow meter upstream from the taps 111 and 112 are taken at different locations as shown in FIGS. 1 and 3 and described by block 204. Specifically, measurements of the inner diameter of the body 101 adjacent its upstream or inlet end are taken at four different locations as indicated at 1-1, 2-2, 3-3 and 4-4 in FIG. 3. The measurements are taken using measurement instruments such as an inside micrometer or similar device, having precision of 0.02 mm (0.001 inches) and telescoping gauges with extended handles of 300 mm (12 inches). When taking these measurements, the technician must carefully assure that the inside micrometer is on the true centerline and perpendicular to the axis of the pipeline. This is important to insure that the true inside diameter of the fluid flow meter is measured at the designated measurement locations.

After the inside diameter measurements are taken, the mean value of the four measurements is calculated as described by block 206. The result is the meter inside diameter ($D_m$) that is used in subsequent calculations described below.

Figure 4:
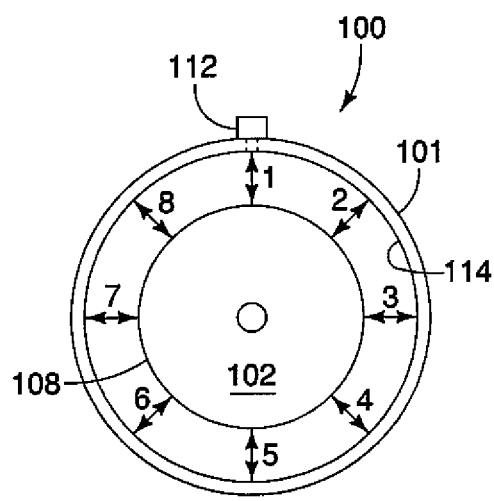
FIG. 4 is a schematic diagram taken generally along line 4-4 of FIG. 1 illustrating different measurement locations of the distance between the beta edge of the cone type displacement member and the inner wall of the meter body of the meter of FIG. 1.
Figure 2A:
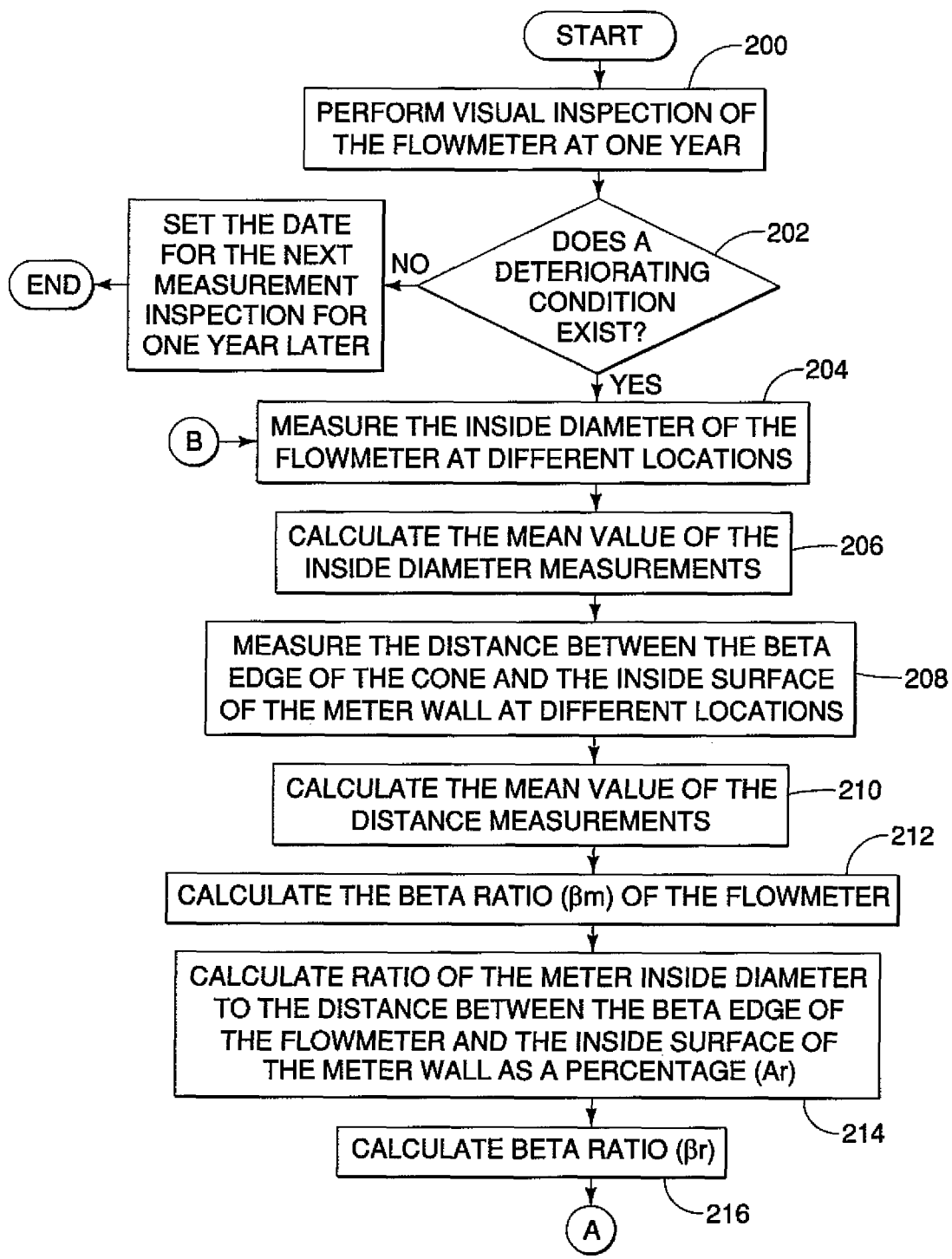
FIGS. 2A and 2B represent a flow diagram illustrating a preferred embodiment of the method of the invention.
Figure 2B:
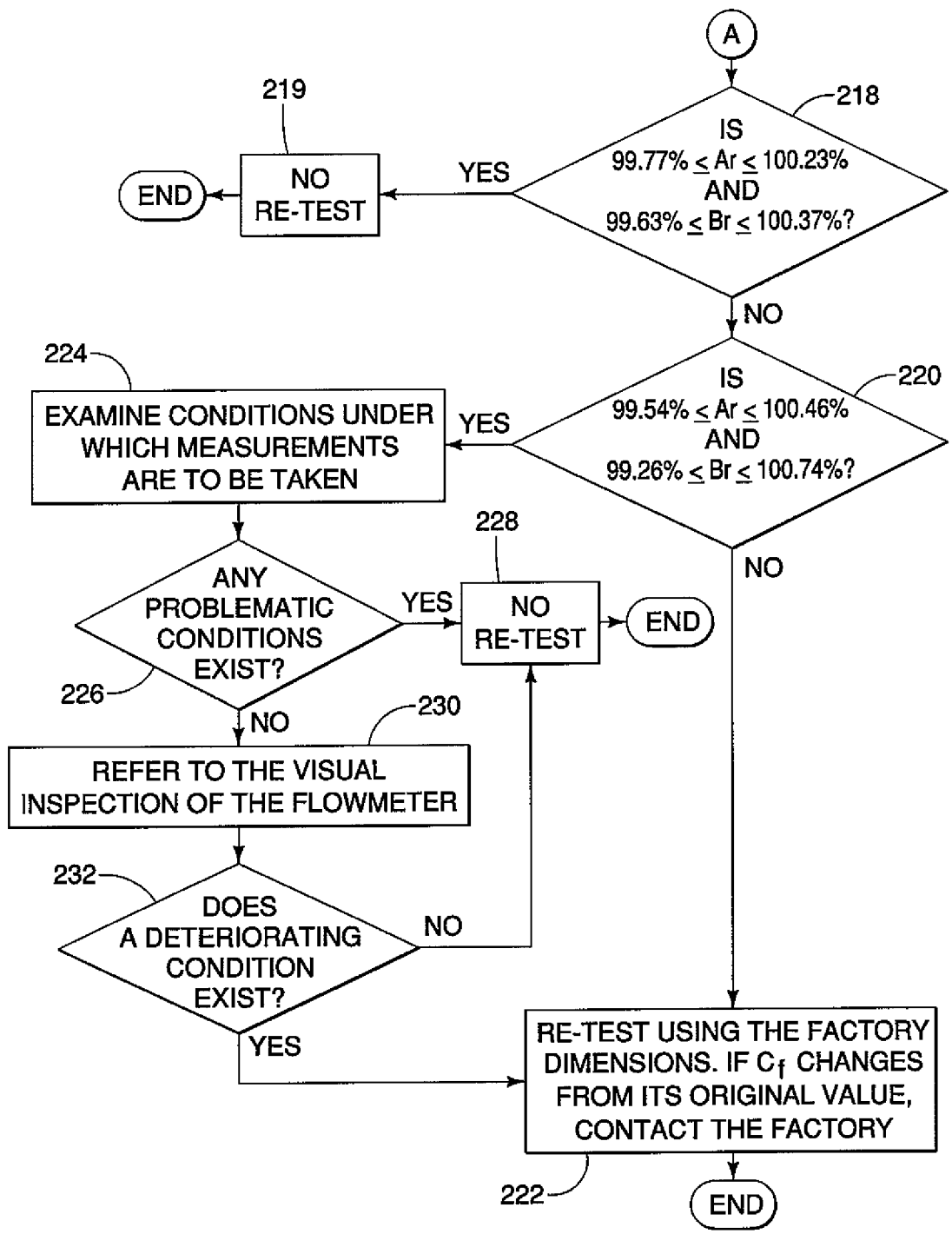

The method also includes measuring the distance between the edge (i.e., beta edge) 108 of the fluid displacement member 102 and the inside surface 114 of the meter body 101 at different designated locations as described by block 208. As shown in FIG. 4, eight different measurements are taken of the distance between the edge 108 of the fluid displacement member 102 and the inside surface 114 of the meter body 101. After the distance measurements are taken, the mean value of the distant measurements is calculated as described by block 210. The mean value of the distance measurements is used to determine the beta ratio of the fluid flow meter "$\beta_m$" as described by block 212. Specifically, the $\beta_m$ ratio is determined using equation (1):

$$\beta_m = \sqrt{\frac{4 \cdot \text{gap}}{D_m}\left(1 - \frac{\text{gap}}{D_m}\right)} \tag{1}$$

where $D_m$ is the inside diameter of the flow meter body 101 in meters (m) based on the field measurement and "gap" is the distance in meters (m) between the edge 108 and the inside surface 114 of the meter body 101.

Next, the variable $A_r$ is determined using equation (2):

$$A_r = (D_m/D_i)^2 * 100 \tag{2}$$

where $A_r$ is the calculated ratio of $D_m$ and the initial inner diameter sizing of the body $D_i$ expressed as a percentage (%) (block 214).

Using the measured value $\beta_m$ and the beta ratio $\beta_i$ from the initial sizing of the cone of the fluid displacement member 102, the variable $\beta_r$ can be determined from equation (3) as follows:

$$\beta_r = (\beta_m/\beta_i)*100 \tag{3}$$

where $\beta_r$ is the ratio of the beta ratios $\beta_m$ and $\beta_i$ expressed as a percentage (block 216).

After making the above calculations, the values $A_r$ and $\beta_r$ are used to evaluate the fluid flow meter 100.

To determine if calibration, re-calibration or replacement is necessary, the following acceptance criteria are used to evaluate the condition of the fluid displacement member 102 and the flow meter body 101. Specifically, if $A_r$ is between 99.77% and 100.23% and $\beta_r$ is between 99.63% and 100.37% as shown by block 218, then the measurements exhibit normal variation and no re-test is needed (block 219).

If $A_r$ and $\beta_r$ are not within the above limits but are within the limits of 99.54%≤$A_r$≤100.46% and 99.26%≤$\beta_r$≤100.74% shown in block 220 then the user repeats the measurement set to reinforce its validity. The user also examines the conditions under which the measurements are to be taken (block 224). If problematic conditions exist such as bad weather conditions (i.e., snowstorm, thunderstorm, etc.) then no-re-tests are performed as shown in block 228 because such conditions may contribute in increase in measurement variations.

If there are no problematic conditions, then the operator refers to the visual inspection of the flowmeter (block 230) completed in block 200. If a deteriorating condition exists, the meter gets re-tested as shown in block 222. Alternatively, if a deteriorating condition does not exist, then no re-test is performed as shown by block 228.

If $A_r$ and $\beta_r$ or either of $A_r$ or $\beta_r$ are outside out of the limits shown in block 220, then a re-test is performed using the factory dimensions on the sizing and/or original test report for the flowmeter as shown in block 222. In this way, the operator can determine if the coefficient of flow ($C_f$) has changed significantly. If $C_f$ has changed significantly, the user should then contact the company and provide the new dimensions, $C_f$ and other relevant details to the company because the company maintains a permanent record, including the history, of the flow meter. Such information allows the company to monitor its meters for informational purposes. Also, not all test labs are familiar with the interrelatedness of $C_f$ and the meter dimensions or the levels of significance of the dimensions. The company therefore is in a position to advise the end user if there is an error in the calibration of the meter.

In another embodiment, an "as built" measurement set including the measured values described above is provided to a purchaser/user with the documentation package that accompanies each purchased flow meter. The "as built" measurement set includes the above measurements, which are taken and documented by the manufacturer, and used as a guide for taking preliminary field measurements to assure that the "as built" and the preliminary field measurements are similar. Specifically, the "as built" measurement set will provide the initial beta ratio ($\beta_i$) and the initial inside diameter ($D_i$) of the flow meter will include a test report (if the flow meter was tested).

If a user does not order the "as built" measurement set when purchasing the flow meter 100, then preliminary field measurements may be taken to calculate the initial beta ratio ($\beta_i$) and the initial inside diameter ($D_i$) of the flow meter. The preliminary field measurement set is used to calculate the following expression:

$$\beta_i = \sqrt{\frac{4 \cdot \text{gap}}{D_i}\left(1 - \frac{\text{gap}}{D_i}\right)} \tag{1}$$

From this expression, the measured inlet area to the area based on $D_i$ is expressed as a percentage as described in equation (2) above. Using the calculated value $\beta_m$ and the beta ratio $\beta_i$ determined from the initial sizing, the variable $\beta_r$ can be determined from equation (3) above. The resultant values are compared to the acceptance criteria described above to determine if calibration, re-calibration or replacement is necessary.

While several particular embodiments of the present method for field-measuring a fluid flow meter have been shown and described, it will be appreciated by those skilled in the art that changes and modifications may be made thereto without departing from the invention in its broader aspects and as set forth in the following claims.

What is claimed is:

1. A method for taking field measurements of a fluid flow meter including a fluid displacement member to determine when to calibrate the fluid flow meter, said method comprising:
    (a) removing the flow meter from a pipeline;
    (b) taking measurements of an inside diameter of the flow meter body using a measurement device;
    (c) taking measurements of a distance between the fluid displacement member and an inside surface of the flow meter body using a measurement device;
    (d) determining a Beta ratio ($\beta_m$) and variables ($A_r$) and ($\beta_r$) based on said measurements and the following equations:

$$\beta_m = \sqrt{\frac{4 \cdot \text{gap}}{D_m}\left(1 - \frac{\text{gap}}{D_m}\right)}$$

where $D_m$ is the inside diameter of the flow meter body in (m), $$A_r = (D_m/D_i)^2*100$$

where $A_r$ is the calculated ratio of $D_m$ and the initial inner diameter sizing of the body $D_i$ expressed as a percentage (%), and $$\beta_r = (\beta_m/\beta_i)*100$$

(e) determining if the variables $A_r$ and $\beta_r$ are within designated ranges; and
    (f) performing calibration of the flow meter based on whether the $A_r$ and $\beta_r$ are within or outside of the designated ranges.

2. A method for taking field measurements of a fluid flow meter including a fluid displacement member to determine when to calibrate the fluid flow meter, said method comprising:
    (a) removing the flow meter from a pipeline;
    (b) taking at least two measurements of an inside diameter of the fluid flow meter at a location upstream of the fluid displacement member;
    (c) taking at least two measurements of a distance between an outermost edge of the fluid displacement member and an inside surface of the fluid flow meter;

(d) calculating a first mean value based on said at least two measurements of said inside diameter and a second mean value based on said at least two measurements of said distance;

(e) calculating a beta ratio $\beta_m$ based on said first and second mean values, wherein $$\beta_m = \sqrt{\frac{4 \cdot \text{gap}}{D_m}\left(1 - \frac{\text{gap}}{D_m}\right)}$$

where $D_m$ is the inside diameter of the flow meter body in (m);

(f) calculating $A_r$ from the ratio of said first mean value to the initial inside diameter of the fluid flow meter, wherein $A_r(D_m/D_i)^2 * 100$ where $A_r$ is the calculated ratio of $D_m$ and the initial inner diameter sizing of the body $D_i$ expressed as a percentage (%); and (g) calculating $\beta_r$ from the ratio of $\beta_m$ to the initial ratio of the meter, $\beta_i$ wherein $\beta_r = (\beta_m/\beta_i) * 100$ wherein $$\beta_i = \sqrt{\frac{4 \cdot \text{gap}}{D_i}\left(1 - \frac{\text{gap}}{D_i}\right)};$$

wherein Di is the initial inside diameter of the flow meter; and (h) ascertaining whether $A_r$ and $\beta_r$ are within designated calibration limits; and (i) performing at least one calibration of the fluid flow meter $A_r$ and $\beta_r$ are within designated calibration limits.

* * * * *